May 30, 1950        H. RUBIN        2,509,785
TOY FISH
Filed Feb. 12, 1949
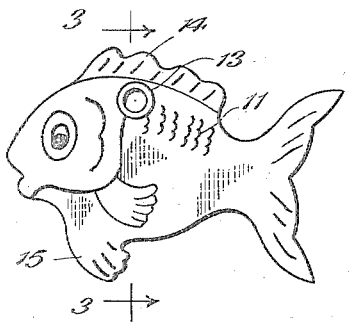
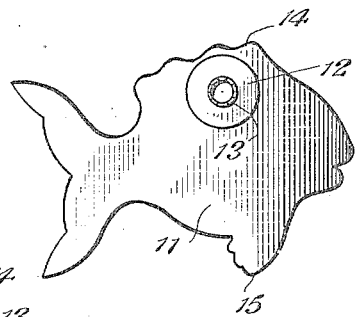
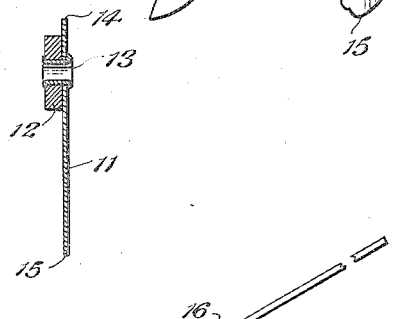
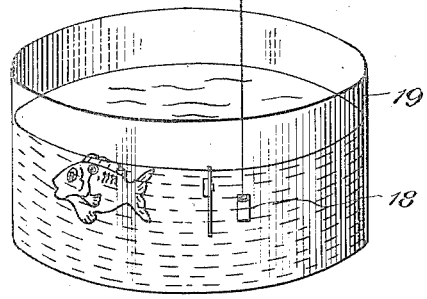
INVENTOR
HERBERT RUBIN
BY
ATTORNEY Patented May 30, 1950

2,509,785

UNITED STATES PATENT OFFICE 2,509,785

TOY FISH

Herbert Rubin, New York, N. Y.

Application February 12, 1949, Serial No. 76,057

6 Claims. (Cl. 46—45)

The present invention relates to improvements in toy fish adaptable to be employed in magnetic fishing games where instead of a hook member dependent from a pole, a magnetic member dependent therefrom is employed to catch the fish.

Presently, toy fish employed in magnetic fishing games are either constructed of buoyant materials or of two side members sealed along their edges to contain a pocket of air. In either instance, in order to have the fish float in an upright position and thus present a realistic appearance when placed in water a weight must be inserted in or affixed to the lower portions thereof. In both instances the manufacturing procedures are relatively expensive.

An object of my invention is to provide a flat toy fish for use in a magnetic fishing game which is simple and inexpensive to manufacture.

A further object of my invention is to provide a flat toy fish for use in a magnetic fishing game made substantially of a heavier-than-water material but having simple buoyant means to enable the same to present a realistic appearance by floating in an upright manner when placed in water.

Other objects and a fuller understanding of my invention may be had by referring to the following description and claims, taken in conjunction with the accompanying drawing which illustrates a preferred embodiment thereof, it being understood that the foregoing statement of the objects of my invention is intended to generally explain the same without limiting it in any manner.

Fig. 1 is a front elevational view of a toy fish embodying my invention.

Fig. 2 is a rear elevational view thereof.

Fig. 3 is a sectional view thereof taken along line 3—3 on Fig. 1.

Fig. 4 is a perspective view showing the toy fish floating in a tank of water and fishing means which may be employed in connection therewith.

Referring to the drawing, the embodiment of my invention shown comprises a thin body member 11 shaped to present the lateral outline of a fish, buoyant means 12 affixed to the upper portion of said body member by a rivet 13 of magnetic material.

The body member is preferably cut from a relatively thin plastic sheet and the front portion thereof is marked with lines to indicate mouth, eye, fin, gill opening and tail fin areas. The rear portion thereof is preferably left blank although it may be similarly marked. The plastic sheet from which it is cut is made of a material having a specific gravity greater than unity so that if it were not for buoyant means affixed thereto the fish would not ordinarily float in water, but would sink to the bottom.

The buoyant means 12 may be preferably an annular cork or rubber member and is preferably affixed to the upper portion of the body member 11 by a metallic rivet 13. The amount of cork or rubber or the like is determined by the relative specific gravities of the material of which the body member 11 and the rivet 13 are constructed and it is so chosen that when the fish is placed in water, the dorsal portion 14 just cuts the surface of the water. The said buoyant means 12 is placed above the horizontal axis of the body member 11 so that when the fish is placed in water, the body member 11 will float upright, thus placing the ventral portion 15 of the body member substantially vertically underneath the dorsal portion 14.

The rivet 13 is made of a magnetic material such as steel in order that the fish may be removed from the water by magnetic means.

The toy fish is intended to be used in connection with a toy fishing pole 16 from which depends by a line 17 magnetic means 18. The magnetic means may be an Alnico or similar magnet.

In playing a game with the toy fish, a bowl 19 may be filled with water and the fish permitted to float therein. The player employs fishing pole 16 and attempts to bring the magnetic means 18 close enough to the rivet 13 to attract the same to it and of course, when the same are brought in contact the fish may be pulled from the water by elevating the pole. In order to permit the players to score the game, body member 11 of each toy fish so employed may be made of variously colored plastics and each color may be given a different score value. As a variant, each toy fish may contain a number indicating a score value.

The fact that the body member 11 may be stamped from a thin sheet of plastic enables the maker to minimize the cost factors in the manufacture thereof. In addition, in the embodiment shown, the buoyant means 12 and the rivet 13 are affixed in one operation. Here again the cost factor is kept at a minimum. Further, although the component parts are simple to make and assemble, the fish presents a natural appearance when placed in water for it floats in a substantially upright position.

I have shown a preferred embodiment of my invention, but it is obvious that numerous alterations and changes may be made without departing from its spirit. Thus, the buoyant means 12 need not be affixed to the body member 11 by rivet 13 but might be affixed to the said body member by an adhesive, in which event it would then be necessary to affix separately to the body member 11 some magnetic material so that the fish could be attracted to magnetic means 18. Likewise, buoyant means 12 may be affixed to the body member 11 by a connecting means of magnetic material other than the rivet 13. So long as such connecting means contains sufficient mass to permit removal of the fish from water by engagement thereof with magnetic means 18 and a subsequent lifting of fishing pole 16, the particular nature, size and shape of such connecting means may be varied. Again, while the rivet 13 is shown to be hollow, in view of the fact that the fish is intended to be used in connection with a magnetic fishing game, the head of the rivet might be solid. In this event there would be a larger area of magnetic material exposed to engagement by magnetic means 18. Then, too, the body member 11 need not be made of plastic but could be made of any water resistant composition. Of course, it is also possible to magnetize the rivet, in which event the fish could then be removed from water upon engagement with a block of magnetic material suspended from the fishing pole.

While the embodiment of my invention shown reveals a toy fish, it is obvious that body member 11 may be so shaped as to indicate or suggest any other aquatic animal such as an eel, reptile, crab or the like, and when in the claims the term "toy fish" is used it shall be deemed to include other such toy aquatic animals.

Although I have described my invention with a certain degree of particularity, it is understood that the present disclosure has been made only by way of example and that numerous additional changes in the details of construction, combination and arrangement of parts may be resorted to without transcending the scope of the invention as hereinafter claimed.

I claim as my invention:

1. A toy fish, for use in connection with a toy fishing pole having magnetic means dependent therefrom, comprising a substantially thin and flat body member having a specific gravity greater than unity and being shaped to present the outline of a fish, connecting means of magnetic material affixed through the upper portion of said body member, and buoyant means sufficient to float at least a part of the dorsal portion of the fish, affixed by said connecting means to said body member, said connecting means and buoyant means being so positioned that the fish will float upright in water.

2. A toy fish, as described in claim 1 hereof, the mass of said connecting means being sufficient in amount to enable the removal of the fish from water upon engagement thereof with said magnetic means.

3. A toy fish, for use in connection with a toy fishing pole having magnetic means dependent therefrom, comprising a substantially thin and flat body member having a specific gravity greater than unity and being shaped to present the outline of a fish, a rivet or magnetic material affixed through the upper portion of said body member and buoyant means sufficient to float at least a part of the dorsal portion of the fish, affixed by said rivet to said body member, the said rivet and buoyant means being so positioned that the fish will float upright in water.

4. A toy fish, as described in claim 3, the mass of said rivet being sufficient in amount to enable the removal of the fish from water upon engagement thereof with said magnetic means.

5. A toy fish, for use in connection with a toy fishing pole having magnetic means dependent therefrom, comprising a substantially thin and flat body member having a specific gravity greater than unity and being shaped to present the outline of a fish, a rivet of magnetic material affixed through an upper portion of said body member, annular buoyant means of a substantially non-pressure-responsive material and sufficiently buoyant to float at least a part of the dorsal portion of the fish affixed by said rivet to said body member, said rivet and buoyant means being so positioned that the fish will float upright in water.

6. A toy fish, as described in claim 5, the mass of said rivet being sufficient in amount to enable the removal of the fish from water upon engagement thereof with said magnetic means.

HERBERT RUBIN.

REFERENCES CITED

The following references are of record in the file of this patent:

UNITED STATES PATENTS

| Number | Name | Date |
| --- | --- | --- |
| 420,149 | Elson | Jan. 28, 1890 |
| 450,395 | Boynton | Apr. 14, 1891 |
| 464,391 | Samuels | Dec. 1, 1891 |
| 2,018,038 | Steinberg | Oct. 22, 1935 |
| 2,290,067 | Parsons | July 14, 1942 |